United States Patent [19]

Stephens

[11] 3,767,226
[45] Oct. 23, 1973

[54] STABILIZER FOR VEHICLE
[76] Inventor: James M. Stephens, 3310 Julian, Long Beach, Calif.
[22] Filed: Mar. 24, 1972
[21] Appl. No.: 237,811

[52] U.S. Cl. .......................................... 280/150.5
[51] Int. Cl. .......................................... B60s 9/02
[58] Field of Search.................. 280/150.5; 248/352, 248/354; 254/86 H, 86 R

[56] References Cited
UNITED STATES PATENTS
| 3,475,008 | 10/1969 | Taylor | 280/150.5 |
| 3,104,891 | 9/1963 | Dalton | 280/150.5 |
| 3,561,732 | 2/1971 | Pulcini | 280/150.5 |
| 2,840,391 | 6/1958 | Stiel | 254/86 R |
| 3,197,179 | 7/1965 | Arnes | 248/354 R |

Primary Examiner—Robert R. Song
Attorney—Allan R. Fowler et al.

[57] ABSTRACT

A stabilizer for land vehicles, such as recreational motor homes, is provided for jacking the vehicle to a position at least partially lifting the weight of the vehicle off its supporting springs so that movement of persons within the vehicle will not result in rocking of the vehicle. The stabilizer comprises a pivotally supported pair of legs at the front and rear of the vehicle, each leg pivotally supporting at its free end a foot. Springs bias the legs into raised position and power operated means lower the legs into vehicle lifting position. The pivotal articulation between the legs and the feet includes slots to accommodate vehicle lifting and lowering movement of the legs without dragging the feet on the ground, and springs interconnecting the legs and the feet bias the feet into a position relative to the legs such that the foot is held flat against the leg with the outer ends of the slots drawn against the pivot.

3 Claims, 5 Drawing Figures

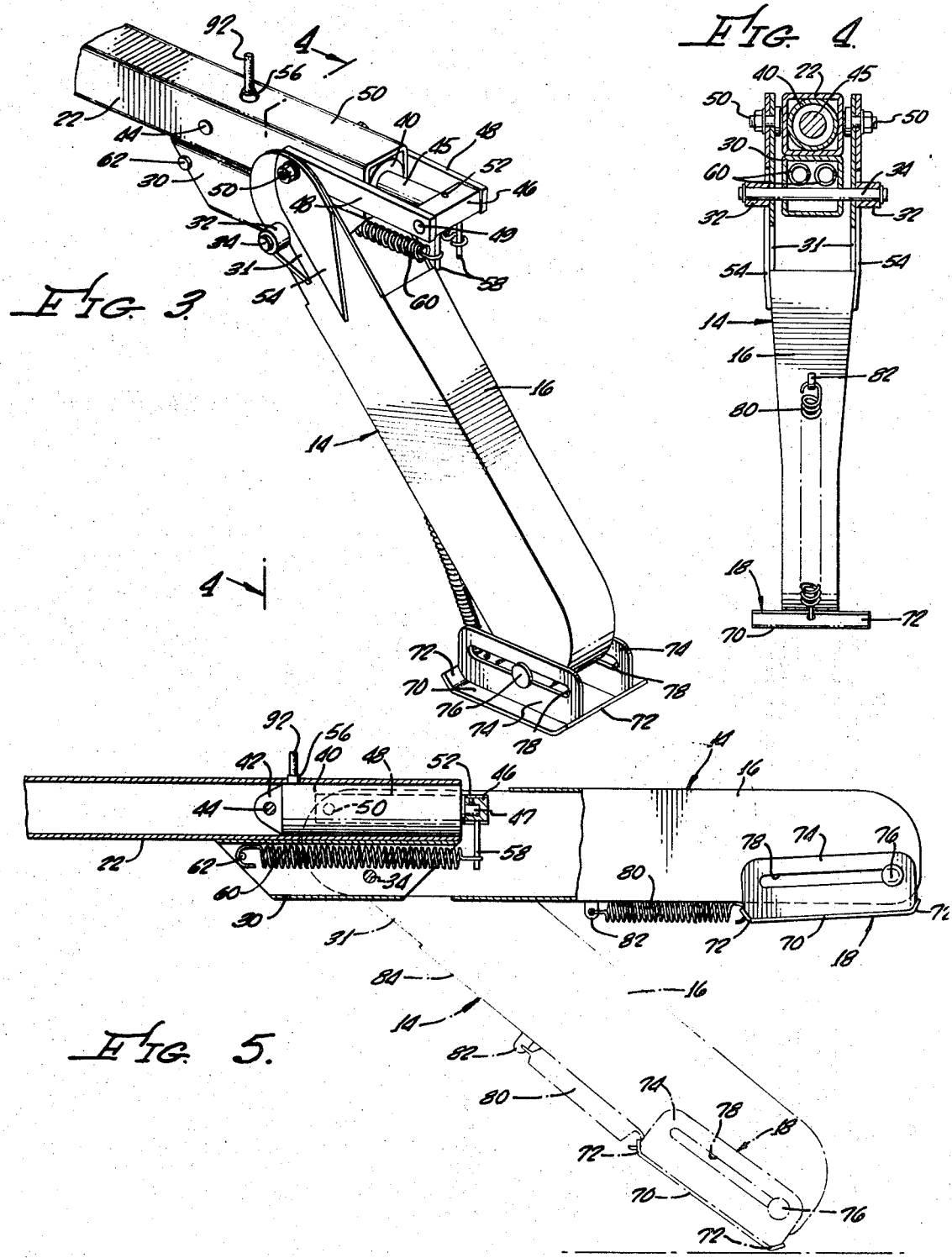

STABILIZER FOR VEHICLE

BACKGROUND OF THE INVENTION

Recreational vehicles, both self-propelled and trailer types, are supported on springs as are all modern highway vehicles, to shield the contents from road shocks. Because recreational vehicles are equipped with many types of loosely-stowed household particles, such as dishes, glassware, cooking vessels and electrical appliances, and relatively delicate appliances, such as electrical refrigerators, the spring cushioning needed to protect such contents from damage due to road shocks may be considerably softer than the springing on vehicles used for trucking operations, and may render the vehicle unstable to the movement of persons within it. The instability may be evidenced by unpleasant rocking of the vehicle as the occupants move about. Moreover, some types of appliances, such as mechanical refrigerators, may not function properly if not level or if subjected to rocking, and even if the refrigerator itself is not adversely affected there may be spillage of liquids, such as water placed in trays to be frozen into ice cubes. Jacks have been used in association with semi-trailers of the type used in hauling heavy loads, but such jacks are mounted to be swung down to a vertical position and are usually provided in a telescoping configuration with a screw threaded interconnection between the two telescoping components for adjusting the length of the jack, and thus the height at which the semi-trailer is supported, after the jack is in the vertical position. Some are provided with pivotally supported feet, but because the jack is first brought to vertical position and then is adjusted for height there is no provision for relative movement between the jack and the foot other than pivotal.

In at least one embodiment of a jack for a travel trailer the jack is of fixed length and therefore effects a lifting of the vehicle incident to pivotal movement of the jack from its retracted position. A screw threaded traverse mechanism is used for moving the jack into vehicle-lifting position. The pivotal mounting for the jack traverses the screw, and thus supplementary bracing of the jack is required.

SUMMARY OF THE INVENTION

In accordance with the present invention, a fixed length jack member is pivotally supported on a fixedly positioned pivot underneath the motor home or travel trailer on the opposite sides thereof at the front and rear. Springs bias the jacks into retracted position beneath the vehicle and out of sight, and preferably the pivots are so located inwardly from the sides of the vehicle that the free ends of the jacks are concealed beneath the vehicle. Each jack has associated with it a fluid pressure operator comprising a piston movable within a cylinder, one of these components being attached to the vehicle and the other connected to the jack so that upon the admission of fluid under pressure, such as compressed oil, into the cylinder the piston will be moved from an idle position at one end of the cylinder to an operated position at the other end of the cylinder, imparting downward pivotal movement of the jack accompanied by increasing tensioning of the jack retracting springs.

At its free end, the jack carries a pivot pin which is disposed in slots in spaced vertically standing flanges in a foot member. A spring under tension interconnects the foot and the jack member, folding the foot up into surface engagement with the jack member, and with the outer ends of the two slots engaging the pivot pin, when the foot is out of engagement with the surface upon which the vehicle is standing. When the jack operating mechanism has power applied and the jack is pivotally moved downwardly, the foot comes into contact with the ground and rocks downwardly into flat surface engagement therewith. As pressure is applied to the foot due to continued movement of the jack sufficient frictional engagement between the foot and the ground develops to preclude dragging of the foot upon the ground as the jack continues to move. When this happens the jack, continuing to move, draws the pivot that supports the foot inwardly of the now stationary foot, the slots accommodating this relative movement between the jack and the foot. The foot is of sufficient size and the slots are of sufficient length that the piston in the cylinder will reach the limit of its operated position and terminate pivotal movement of the jack before the pivot pin that supports the foot reaches the inner ends of the slots and drags the foot on the ground.

Because the pivotal support for the jack is in a fixed location on the vehicle and is not a part of a traverse mechanism, no supplemental bracing of the jack is needed. With power operating means for the jack all of the manual labor and awkwardness of adjusting screw devices is avoided. Moreover, power may be applied to all four of the operating cylinders at the same time to effect a uniform and generally level lifting of the vehicle rather than bringing the jacks from retracted to operative position one at a time.

DESCRIPTION OF THE DRAWINGS

For a complete understanding of the invention reference may be had to the following detailed description to be interpreted in the light of the accompanying drawings wherein:

FIG. 3 is a perspective view showing one of the stabilizer jacks in its operated condition;

FIG. 4 is a sectional view taken generally on the line 4—4 of FIG. 3; and

FIG. 5 is an elevational view partly in section showing the stabilizer jack in its retracted position, and in dotted line showing it at the instant of contact between the foot and the ground as the jack is being brought into operated position.

DETAILED DESCRIPTION

Figure 1:
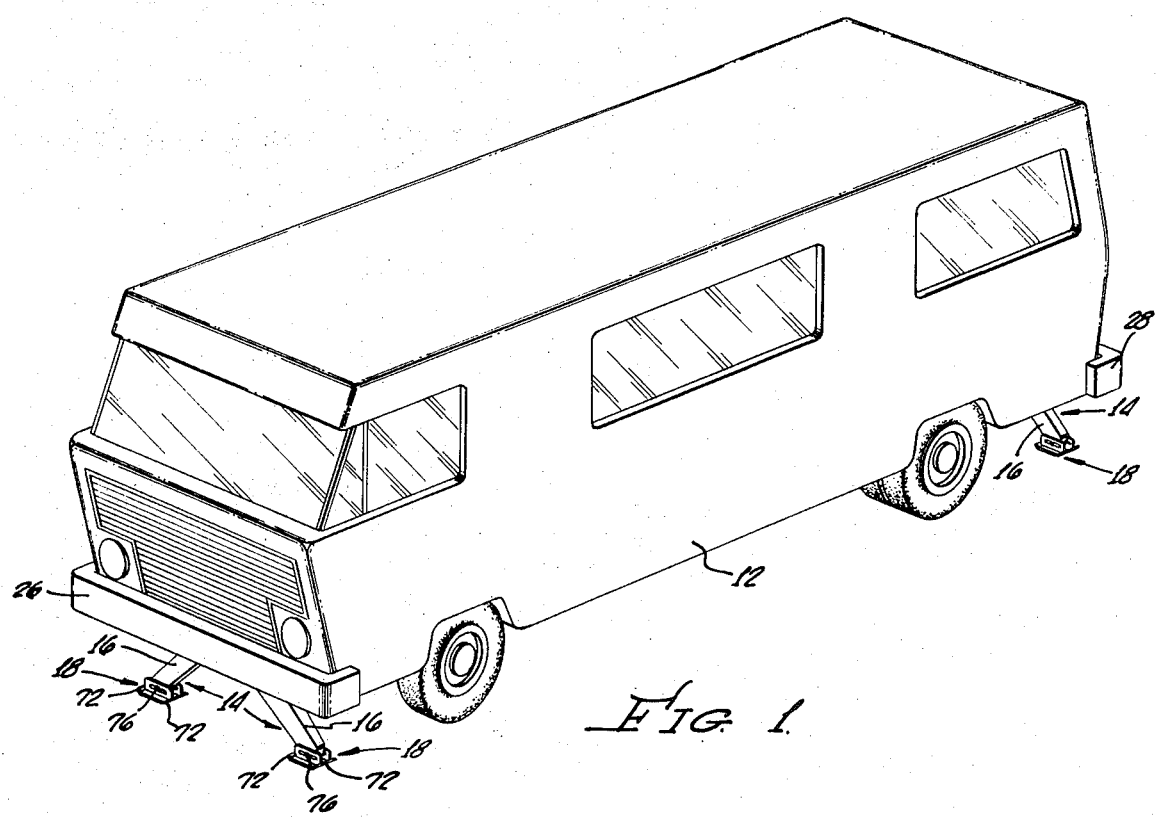
FIG. 1 is a perspective view of a four-wheeled motor vehicle with stabilizer jacks in accordance with the present invention, three of the four jacks being shown in FIG. 1.

Referring now to the drawings and particularly to FIG. 1, the reference numeral 12 designates a four-wheeled motor vehicle of a type which is commonly called a motor home. Stabilizer jacks designated generally by the reference numeral 14 and consisting of leg numbers 16 terminating in foot members 18 are seen in FIG. 1, there being a pair at the forward end of the vehicle as shown and a pair at the rear, only one of which, on the left hand side of the vehicle is seen in FIG. 1. As shown in FIG. 1, the stabilizer jacks 14 are in their stabilizing positions, extending obliquely downwardly and outwardly from the points at which they are connected to the vehicle, the feet 18 resting upon the ground.

Figure 2:
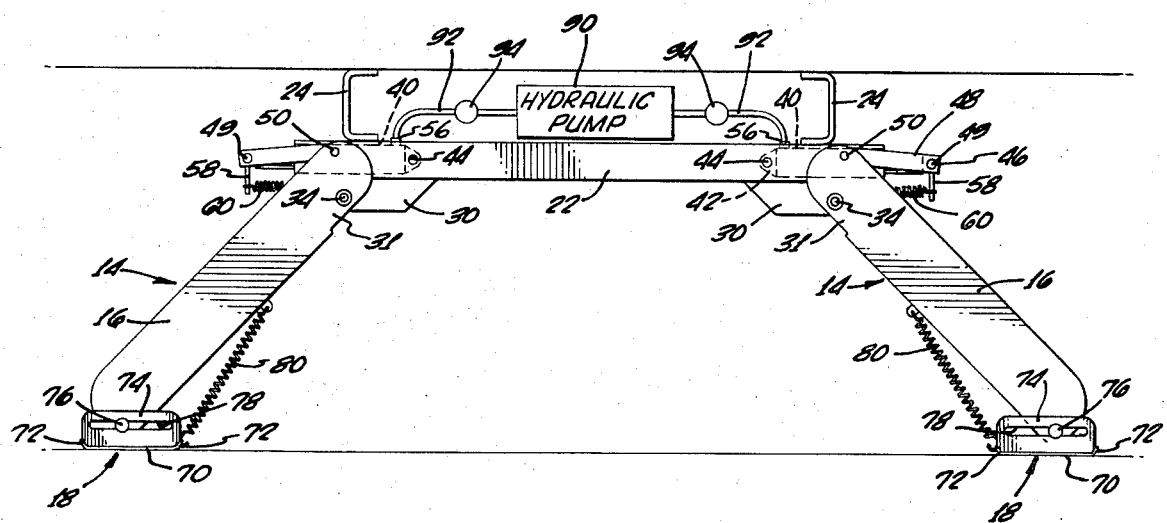
FIG. 2 is an elevational view underneath the vehicle at one end thereof showing a pair of stabilizing jacks associated with frame members of the vehicle.

Turning now to FIG. 2 it will be noted that a beam or cross-member 22 is secured to the underside of the longitudinal channel members or rails 24 of the frame of the vehicle 12. In a preferred embodiment of the invention, the beam 22 is tubular and of generally square cross-section, and may be secured to the frame members 24 by bolts, if they will not interfere with the stabilizer jack mounting and operating components or by welding to the frame members 24. It will be understood that two cross-members 22 will be secured to the frame members 24, one at the forward end of the vehicle behind the front bumper 26 and the other at the rear of the vehicle, forward of the rear bumper 28.

The cross-member 22 has secured to the underside thereof at each end a bracket member 30 for pivotally supporting a stabilizer leg member 16. The bracket 30 may be a length of channel-iron with the web portion secured to the cross-member 22, as by welding, or as shown in FIGS. 4 and 5, it may be a length of the same type of tubing that is used for the cross-member 22.

The leg members may be formed of channel-iron stock, and may be of uniform width from end to end or, as shown in FIG. 4, may be tapered downwardly. If they are made from channel-iron stock a short length of the web of the channel is cut away to cause the flanges to extend beyond the end of the web to provide arms 31 for pivotally mounting the leg member 16 on the bracket 30. The mounting arm portions 31 of the leg member 16 may be reinforced by having secured thereto, as by welding, drilled bosses 32, and the leg member 16 is pivotally mounted on the bracket 30 by passing a pivot pin 34 through the bosses 32 and through holes drilled transversely of the bracket 30.

Inside the tubular beam 22 is mounted a cylinder 40 which has at its closed end an ear 42 having a hole through which is passed a pin 44 which enters the tubular beam 22 from one side through a hole, passes through the hole in the ear 42 and out through a hole in the other side of the beam 22. The cylinder is thus prevented from rotating within the beam 22 or from moving longitudinally of the beam, and the pin may have a head on one end and be retained by any suitable means such as a snap ring at the other end.

A connecting rod 45 emerges from the open end of the cylinder 40 and the rod 45 is connected to a piston (not shown) contained in the cylinder 40. Alternatively, the rod 45 may in fact be the piston. At its free end the connecting rod 45 carries a cross-head 46 which is formed at its ends into pivots 49 on which are fitted links 48 to connect the cross-head 46 to pivot pins 50 mounted on the arms 31 by means of which the stabilizer leg member 16 is pivoted to the bracket 30. A pin 52 passes through the cross-head 46 and the flattened end 47 of the connecting rod 45 and connects the cross-head to the connecting rod. The arms 31 of the leg member 16 may be reinforced at the points where the pivot pins connect them to the links 48 by flat plates 54 which may be welded to the outer surfaces of the arms 31 of the leg member 16. Communication with the interior of the cylinder 40 is provided by means of a tubular fitting 56 through which fluid under pressure, such as compressed oil, may be admitted to the cylinder 40.

The cross-head 46 is provided with downwardly extending spring posts 58 over which are fitted the ends of tension springs 60. The opposite ends of the springs 60 engage a retaining pin 62 that is passed through the bracket 30 and may be retained in the bracket by screw threads or by a snap ring. Preferably, the springs 60 exert a sufficient pull on the cross-head 46 that when no pressure is applied on the piston in the cylinder 40 through the fluid admitting tube 56 the force of the springs tending to move the cross-head leftwardly as viewed in FIGS. 3 and 5 will exceed the force tending to move the pivot pins 50 clockwise due to the weight of the leg member 16 and the leg member will be retracted by the springs to the position shown in solid lines in FIG. 5.

The foot 18 for the stabilizer jack comprises a flat sole-plate 70 with upturned ends 72. The sole-plate 70 is provided with upstanding flanges 74 spaced apart a sufficient distance for the free end of the leg mmeber 16 to enter the space between them. The side flanges of the leg member 16 are provided near their outer ends with appertures for receiving a foot member retaining pivot pin 76. The flanges 74 associated with the foot member 18 are provided with elongated slots generally parallel to the sole-plate 70 and the pin 76 passes through the slot in one of the flanges 74, then through the holes in the leg member 16 and then through the slot in the other flange, and it may be retained by any suitable means, such as a threaded nut, a snap ring or a cotter pin. The inner upturned end 72 of the soleplate 70 is provided with an apperture which is entered by one end of a tension spring 80 and the other end of the spring engages a lug 82 carried by the leg member 16. It was mentioned hereinbefore that the leg member 16 may be formed from channel-iron and if desired the channel may be enclosed throughout the major portion of its length by welding to the free edges of the side flanges of the channel a closure plate 84, to which the spring retaining lug 82 may be attached. When the leg member 16 is in such a position that the foot member 18 is free to respond to the spring 80 the foot member is drawn into flat surface engagement with the leg member 16 and is drawn toward the point of pivotal mounting of the leg member to bring the outer ends of the slots 78 into engagement with the pin 76.

As previously mentioned, with no power applied to the cylinder 40 through the fluid access fitting 56 the leg member 16 will occupy the position shown in solid lines in FIG. 5. In FIG. 2 a source of fluid under pressure is indicated schematically by the rectangle 90 which is labeled HYDRAULIC PUMP and which may be considered as representing an oil pump or a manifold through which compressed oil may be distributed from a pump to the fluid access fittings 56 through conduits 92. Each conduit is indicated as including a valve 94, although it will be understood that provision may be made for controlling all of the stabilizer jacks from a common valve or from individual valves located at a single control point. When oil is admitted underpressure into the fittings 56 it forces the piston contained in the cylinder 40 to the right as viewed in FIGS. 3 and 5, thereby moving the cross-head 46 to the right, and through the links 48 and the pivots 50 imparting clockwise motion to the leg member 16 about its pivot 34. These directions of movement refer only to FIGS. 3 and 5, representing a stabilizer on the left hand side of the vehicle, since a stabilizer on the right hand side would move in the opposite direction.

As soon as the leg 16 has been moved into the position shown in dotted line in FIG. 5, the outer upturned end 72 of the foot member 18 having come into contact with the ground, the foot member 18 rocks in counterclockwise direction about the pivot pin 76 until the foot member 18 is flat on the ground. Continued movement of the leg member 16 causes downward pressure upon the foot member 18, pressing it solidly into contact with the ground and causing it to remain stationary while the free end of the leg member 16 and the pin 76 move leftwardly. Preferably the amount of pivotal movement that the piston in the cylinder 40 may impart to the leg member 16 is insufficient to bring the pin 76 to the opposite ends of the slots 78 in the foot member 18 so that the leg member cannot drag the foot member 18 upon the ground while the foot member is supporting, to any appreciable extent, the weight of the vehicle. Actually it is to be expected that the vehicle will have been lifted at its four corners sufficiently to provide the desired stability before the pin 76 reaches the left hand ends of the slots 78 as viewed in FIGS. 3 and 5 and in both stabilizer jacks of a pair as viewed in FIG. 2.

It will be appreciated that when the vehicle has been lifted to an extent represented by the positions of the pivot pins 76 in FIG. 2 the vehicle will be exerting considerable pressure between pins 76 and the lower surfaces of the slots 78 and such pressure will in all probability prevent sideways movement of the two stabilizer jack leg members 16 of a front end or rear end pair within the slots in the foot members 18. With pressure maintained in the operating cylinders 40 of both stabilizer jacks 14 of a pair one leg member cannot move relative to its foot member 18 along the slots 78 without movement of the other leg member in the same direction relative to its foot member. It will be understood that in raising the vehicle for the purpose of imparting stability the vehicle will not be raised sufficiently to lift the tires off the ground, so that the frictional engagement of the tires with the ground will preclude lateral shifting of a front end or rear end pair of leg members 16 relative to their foot members 18. Even a sharp impact in the area above one of the stabilizer jacks is not likely to cause slippage of the pivot pin 76 in the slots 78 of the foot member 18 because such slippage will be prevented by the pressure of the pin 76 on the lower surface of the slots. It is to be noted that because the stabilizer jacks extend obliquely outwardly when they are in the stabilizing position, they act as struts to impart lateral stability to the vehicle.

When fluid pressure in the cylinders 40 is relieved the vehicle is lowered to its operative position, fully supported on its axles by its springs. Thereafter, the springs 80 retract the stabilizer jacks to the positions shown in solid lines in FIG. 5, completely concealed beneath the vehicle.

It will be understood that stabilizer jacks of the type disclosed herein may be used in pairs, one pair toward the front and the other pair toward the rear, of a travel trailer, forward and aft of the single axle or twin axle of the trailer. It will also be understood that they may be used on other types of vehicles than recreational vehicles. For example, vehicles, self propelled as well as trailers, are used for exhibiting devices and equipments of many kinds to the public, and it may be desirable to stabilize and level such vehicles against rocking due to movements of persons within the vehicles.

What is claimed is:

1. A stabilizer for lifting a vehicle and stationarily supporting it which comprises:
   a leg member pivotally attached to the underside of of the vehicle;
   means for holding the leg member in raised position beneath the vehicle;
   a foot member pivotally carried by the leg member at the free end thereof;
   the pivotal mounting of the foot member on the leg member including a capability of translational relative movement between the foot member and the leg member enabling the leg member to move relative to the foot member while the latter remains stationary, comprising a pivot pin carried by the leg member for pivotally supporting the foot member and the foot member having a slot extending in a direction parallel to its sole to receive the pivot pin and accommodate movement of the leg member relative to the foot member while the foot member has its sole pressed against the stabilizing surface;
   means for moving the leg member pivotally downward to first bring the foot member into contact with the ground and then to lift the vehicle; and
   yieldable means urging said foot member to seek a position folded against said leg member with an end of the slot drawn against the pivot pin.

2. A jack for lifting a vehicle to at least partially relieve the pressure of the vehicle on a cushioning spring which comprises:
   a leg member pivotally supported by the vehicle underneath the vehicle;
   spring means for retracting the leg member upwardly into a position underlying the vehicle;
   fluid pressure operable means comprising a cylinder and a piston interconnecting the vehicle and the leg member adapted to effect pivotal movement of the leg member away from underlying relation to the vehicle accompanied by an increase in the tension of said spring means;
   a pivot pin carried by the free end of the leg member;
   a foot member having a slot serving to articulate the foot member to the pivot pin and enabling the leg member to move relative to the foot member to elevate the vehicle without dragging the foot member after engagement of the foot member with the ground; and
   a spring interconnecting the foot member and the leg member for retracting the foot member into flat engagement with a side of the leg member and with an end of the slot engaging the pivot pin when the leg member is retracted from the vehicle lifting position.

3. A jack in accordance with claim 2 wherein the length of the leg member is such in relation to the extent of pivotal movement imparted by the fluid pressure operable means that the leg member extends obliquely outwardly and downwardly from underneath the vehicle and in addition to elevating the vehicle it acts as a strut imparting lateral stability to the vehicle.

* * * * *